US008312022B2

(12) United States Patent
Wilde et al.

(10) Patent No.: US 8,312,022 B2
(45) Date of Patent: Nov. 13, 2012

(54) SEARCH ENGINE OPTIMIZATION

(75) Inventors: Tom Wilde, Wellesley, MA (US); Kyle D. Morton, Waltham, MA (US); Yuliya Lobacheva, Brighton, MA (US); Nina Zinovieva, Lowell, MA (US); Marie Meteer, Arlington, MA (US)

(73) Assignee: Ramp Holdings, Inc., Boston, MA (US)

( * ) Notice: Subject to any disclaimer, the term of this patent is extended or adjusted under 35 U.S.C. 154(b) by 549 days.

(21) Appl. No.: 12/405,772

(22) Filed: Mar. 17, 2009

(65) Prior Publication Data
US 2009/0240674 A1    Sep. 24, 2009

Related U.S. Application Data

(60) Provisional application No. 61/038,504, filed on Mar. 21, 2008.

(51) Int. Cl.
G06F 7/00     (2006.01)
G06F 17/30    (2006.01)
(52) U.S. Cl. ........................................ 707/740; 707/803
(58) Field of Classification Search .................. 707/740, 707/803
See application file for complete search history.

(56) References Cited

U.S. PATENT DOCUMENTS

| | | | |
|---|---|---|---|
| 5,613,034 A | 3/1997 | Ney et al. | |
| 5,613,036 A | 3/1997 | Strong | |
| 5,991,735 A * | 11/1999 | Gerace | 705/7.33 |
| 6,064,959 A | 5/2000 | Young et al. | |
| 6,081,779 A | 6/2000 | Besling et al. | |
| 6,112,172 A | 8/2000 | True et al. | |
| 6,157,912 A | 12/2000 | Kneser et al. | |
| 6,345,253 B1 | 2/2002 | Viswanathan | |
| 6,418,431 B1 | 7/2002 | Mahajan et al. | |
| 6,484,136 B1 | 11/2002 | Kanevsky et al. | |
| 6,501,833 B2 | 12/2002 | Phillips et al. | |

(Continued)

FOREIGN PATENT DOCUMENTS
EP       1008931 A2     6/2000
(Continued)

OTHER PUBLICATIONS

"BBN Audio Indexer," BBN Technologies, A Verizon Company, last visited on Nov. 6, 2006, http://web.archive.org/web/20020214165834/http://www.bbn.com/speech/audioindexer.html, approximately Feb. 14, 2001, as indicated on Wayback Machine website at http://web.archive.org/web/*/http://bbn.com/speech/audioindexer.html, last visited on Nov. 6, 2006 (3 pages).

(Continued)

Primary Examiner — Cam Truong
(74) Attorney, Agent, or Firm — PatentGC LLC; Kenneth F. Kozik

(57) ABSTRACT

Topic-centric, dynamically-created web pages are compiled from links to multimedia content elements. Keywords are identified within the content elements and used to identify a set of topics related to the content elements. A query string comprising the keywords is executed against the content elements and in response to a request to display information about a topic the query string associated with the topic is executed against the collection of multimedia content elements to identify content elements related to the topic. A dynamically-created web page is displayed that includes computer-executable links to the set of related multimedia content elements.

27 Claims, 7 Drawing Sheets

U.S. PATENT DOCUMENTS

| | | |
|---|---|---|
| 6,611,803 B1 | 8/2003 | Furuyama et al. |
| 6,671,692 B1 | 12/2003 | Marpe et al. |
| 6,687,697 B2 | 2/2004 | Collins-Thompson et al. |
| 6,697,796 B2 | 2/2004 | Kermani |
| 6,728,673 B2 | 4/2004 | Furuyama et al. |
| 6,728,763 B1 | 4/2004 | Chen |
| 6,738,745 B1 | 5/2004 | Navratil et al. |
| 6,768,999 B2 | 7/2004 | Prager et al. |
| 6,785,688 B2 | 8/2004 | Abajian et al. |
| 6,816,858 B1 | 11/2004 | Coden et al. |
| 6,848,080 B1 | 1/2005 | Lee et al. |
| 6,856,997 B2 | 2/2005 | Lee et al. |
| 6,859,799 B1 | 2/2005 | Yuen |
| 6,873,993 B2 | 3/2005 | Charlesworth et al. |
| 6,877,134 B1 | 4/2005 | Fuller et al. |
| 6,973,428 B2 | 12/2005 | Boguraev et al. |
| 6,985,861 B2 | 1/2006 | Van Thong et al. |
| 7,120,582 B1 | 10/2006 | Young et al. |
| 7,194,483 B1 * | 3/2007 | Mohan et al. ............... 707/600 |
| 7,260,564 B1 | 8/2007 | Lynn et al. |
| 7,308,487 B1 | 12/2007 | Dansie et al. |
| 2001/0045962 A1 | 11/2001 | Lee et al. |
| 2002/0082953 A1 * | 6/2002 | Batham et al. ............... 705/27 |
| 2002/0108112 A1 | 8/2002 | Wallace et al. |
| 2002/0143852 A1 | 10/2002 | Guo et al. |
| 2003/0171926 A1 | 9/2003 | Suresh et al. |
| 2004/0006606 A1 * | 1/2004 | Marotta et al. ............... 709/219 |
| 2004/0103433 A1 | 5/2004 | Regeard et al. |
| 2004/0199502 A1 | 10/2004 | Wong et al. |
| 2004/0199507 A1 | 10/2004 | Tawa |
| 2005/0033758 A1 | 2/2005 | Baxter |
| 2005/0086692 A1 | 4/2005 | Dudkiewicz et al. |
| 2005/0096910 A1 | 5/2005 | Watson et al. |
| 2005/0187965 A1 | 8/2005 | Abajian |
| 2005/0197724 A1 | 9/2005 | Neogi |
| 2005/0216443 A1 | 9/2005 | Morton et al. |
| 2005/0234875 A1 | 10/2005 | Auerbach et al. |
| 2005/0256867 A1 | 11/2005 | Walther et al. |
| 2006/0015904 A1 | 1/2006 | Marcus |
| 2006/0020662 A1 | 1/2006 | Robinson |
| 2006/0020971 A1 | 1/2006 | Poslinski |
| 2006/0047580 A1 | 3/2006 | Saha |
| 2006/0053156 A1 | 3/2006 | Kaushansky et al. |
| 2006/0122972 A1 * | 6/2006 | Keohane et al. ............... 707/3 |
| 2006/0242554 A1 * | 10/2006 | Gerace et al. ............... 715/501.1 |
| 2006/0265421 A1 | 11/2006 | Ranasinghe et al. |
| 2007/0005569 A1 | 1/2007 | Hurst-Hiller et al. |
| 2007/0041522 A1 | 2/2007 | Abella et al. |
| 2007/0078708 A1 | 4/2007 | Yu et al. |
| 2007/0100787 A1 | 5/2007 | Lim et al. |
| 2007/0239837 A1 * | 10/2007 | Jablokov et al. ............... 709/206 |
| 2008/0072256 A1 * | 3/2008 | Boicey et al. ............... 725/46 |
| 2009/0006389 A1 * | 1/2009 | Piscitello et al. ............... 707/5 |

FOREIGN PATENT DOCUMENTS

| | | |
|---|---|---|
| JP | 2004350253 A | 12/2004 |
| KR | 20020024865 A | 4/2002 |
| WO | WO-0211123 | 7/2002 |
| WO | WO-2005004442 A1 | 1/2005 |

OTHER PUBLICATIONS

International Search Report for International Application No. PCT/US2006/043561, Date of Mailing May 9, 2007 (3 pages).

International Search Report for International Application No. PCT/US2006/043680, Date of Mailing Apr. 27, 2007 (3 pages).

International Search Report for International Application No. PCT/US2006/043682, date of mailing Mar. 30, 2007, including Written Opinion of the International Searching Authority (10 pages total).

International Search Report for PCT/US2006/043683 dated Aug. 2, 2007 (3 pages).

Lindblad, Christopher J., et al., "ViewStation Applications: Implications for Network Traffic," IEEE Journal of Selected Areas in Communications, 1995.

Little, T.D.C., et al., "A Digital On-Demand Video Service Supporting Content-Based Queries," International Multimedia Conference, Proceedings of the First ACM international conference on Multimedia, Anaheim, CA, Sep. 1993, 10 pages.

Stuart, Anne, "SpeechBot: A Search Engine for Sound," http://hpl.hp.com/cgi-bn/pf.cgi, last visited on Nov. 6, 2006 (4 pages).

Van Thong, et al., "SPEECHBOT: An Experimental Speech-Based Search Engine for Multimedia Content in the Web," Cambridge Research Laboratory, Technical Report Series, 19 pages, Jul. 2001.

Written Opinion of the International Searching Authority for PCT/US2006/04683 dated Aug. 2, 2007 (6 pages).

* cited by examiner

SEARCH ENGINE OPTIMIZATION

CROSS-REFERENCE TO RELATED APPLICATIONS

This application claims priority to and the benefits of U.S. provisional patent application Ser. No. 61/038,504, entitled "Search Engine Optimization" and filed Mar. 21, 2008, the entire disclosure of which is incorporated herein by reference.

FIELD OF THE INVENTION

The invention relates generally to techniques for providing search query results, and more specifically, the creation of web pages that contain multimedia content from various sources that are highly relevant to a search query.

BACKGROUND

The Internet and World-Wide Web (the "Web") have transformed the way people and companies provide and access information. Estimates of the number of web sites available range between twenty and thirty billion. The primary means by which users of the Web navigate and access this massive amount of information is through search engines such as Google, Yahoo! and others.

However, with such a large number of web pages, the likelihood that any one page is provided to an individual entering a search query can vary widely and depend on many factors. Needless to say, web site owners that rely on site traffic, advertising and commercial transactions as a means for generating revenue want their site to appear as often and as "high" in a search result list as possible. Generally, modifying one's web page(s) and online advertising strategy to increase the relevancy and ranking with respect to search engine methodologies is referred to as "search engine optimization"—a practice that has risen from a cottage trade a few years ago to a multi-billion dollar industry. This is no surprise given the amount of advertising-based revenue available through Google AdWords and other similar programs.

Optimizing a website's performance with respect to search engines has traditionally relied on making the page more relevant to the web-crawlers that index the billions of web pages daily, thus increasing its ranking. The web crawlers attempt to "learn" what a page is about by analyzing the URL, the text on the page, links on and to the page, and other page metadata. However, as multimedia content becomes the de facto standard for how to present information on the Web, the ability of a web crawler to "understand" what a web page is about is significantly reduced. As a result, search engines may not attribute a high rank to web pages having significant multimedia content (video and/or audio) even though the content on the page is relevant to a search term.

Conventional approaches to addressing this problem include manually associating topics and tags to multimedia content, either through an editorial process or based on user input. Both approaches have drawbacks, however. Editorially tagging is time consuming and therefore cannot keep pace with the ever increasing amount and rate of multimedia content posted on the Web. Although allowing users to tag content may scale, they only capture a small amount of the content actually covered in the audio/video content. Furthermore, relying on users to tag the content introduces an army of "editors" to the problem, resulting in loss of control, "spam" and tags and topics unrelated to the content.

What is needed, therefore, is a technique for incorporating multimedia content into search engine rankings such that content-rich web sites receive preferable treatment by web crawlers and search engine indexing techniques.

SUMMARY OF THE INVENTION

There are two essential aspects to creating a good set of content-rich pages for search engine optimization—supply of relevant content and understanding what content is in demand. Typically, search engine optimization ("SEO") focuses on the demand aspect by expanding and evaluating keywords to determine what users are searching for and what terms are used for those searches. The supply side is equally important, particularly for content owners with large amounts of frequently changing content, such as news and "infotainment" producers. The invention addresses these challenges by determining which content provides the best source for creating search result pages and analyzing multimedia content for emerging terms and names so that content-rich pages can be produced in a timely fashion.

Embodiments of the invention provide techniques and supporting systems for dynamically constructing web pages that are highly relevant to one or more query search strings. As a result, these web pages are highly-ranked within results sets when a user enters the query terms related to that page. Speech recognition and text extraction techniques are used to recognize key terms and phrases present in multimedia content that would otherwise be overlooked by web spiders and therefore not present in search engine indices. The web pages include links to multimedia content from numerous sources.

In a first aspect, the invention provides a computer-implemented method for producing web pages. Audio signals within multimedia content elements are converted into a text-searchable representation of the multimedia content elements and a content catalog is created from the text-searchable representation. In some embodiments, additional metadata, such as titles, categories and/or names describing the multimedia content elements may be included in the content catalog. One or more queries are executed against the tagged content catalog using a topic listing to identify a subset of topics referenced in the multimedia content elements and, for each topic in the subset, a set of multimedia content elements related to each topic. The topic listing may be compiled from query lists, sports rosters, entertainment listings, for example. In certain implementations, the subset of topics may optionally be filtered via additional criteria, such as a minimum number of multimedia content elements, a minimum number within the past week, and/or a minimum confidence level (as described below). For each topic, a query string is created that includes tags and/or keywords (e.g., topic or context-based metadata, for example) associated with the multimedia content elements related to the topic, and, in response to a request to display information about the topic, the query string associated with the topic is executed. Based on the results of the query, a web page is displayed that includes computer-executable links to the multimedia content elements related to the topic.

The multimedia content elements may be part of a single collection, or be compiled, gathered or identified from multiple unrelated websites. In certain implementations, the content catalog may also include keywords extracted from and/or tags derived from the text-searchable representation which are associated with the respective multimedia elements. In some embodiments, a topic web page is created that includes a listing of the topics in the subset, and each element of the listing references the web page for that topic. The request to display information about the topic may include the selection of one of the topics from the listing, such as a user-initiated HTTP request based on the selection of a hyperlink, or the entry of a search query into a search engine. In some implementations, the tags and/or keywords may be augmented with additional text and phrases related to the tags and keywords and the additional text and phrases may also be associated with the respective multimedia content elements.

In some cases, the web page may include the keywords and/or the additional text and phrases. Further, the web page may also include a contextual placement of the keywords within each of the related multimedia content elements. The web page may optionally include editorially-generated content as well as related content retrieved from other systems. The web page may, in some instances, be created dynamically in response to the request to display information, whereas in other instances it may be "pre-built" and stored (in cache or on disk, for example) and retrieved upon receipt of the request. The stored web pages may, in some cases, be updated periodically based on a frequency (daily) and/or upon detection of a change in the multimedia content.

Scores describing relevancy between topics in the topic listing and the multimedia content elements may be calculated for each multimedia content element based on various confidence levels. The confidence levels may include, for example, a confidence that the text-searchable index accurately represents the audio signals, a confidence that the tags accurately represent the text searchable index, and/or a confidence that the related multimedia content elements match the tags in the query string. In such cases, web page may only include links to content elements having a minimum relevancy score, and the links to the multimedia content elements may be ordered based on the relevancy scores of the respective content elements. The order may additionally or alternatively be based on other metadata associated with the content elements such as date created, popularity, etc.

In another aspect, the invention provides a system for producing web pages that includes a term extraction module, a query processing engine and web page creation module. The term extraction is configured to create a text-searchable representation of a collection of multimedia content by converting audio signals within the content to text. The query processing engine is configured to execute a query against the content catalog using a topic listing to identify a subset of topics referenced in the multimedia content elements and, for each topic in the subset, a set of multimedia content elements related to the topics. The query processing engine is also configured to create a query string of keywords and/or tags associated with the set of related multimedia content elements for each topic and, in response to a request to display information about the topic, execute the associated query string. The web page creation module produces a web page comprising computer-executable links to the set of related multimedia content elements.

The term extraction module may, in some implementations, create a tagged content catalog by extracting tags and/or keywords from the text-searchable representation and associating the tags and keywords with the multimedia content elements from which the keywords were extracted. In certain embodiments, the term extraction module may also augment the extracted tags and/or keywords with additional text and phrases related to the extracted keywords and associate the additional text and phrases with the respective multimedia content elements.

In some cases, the query processing engine may also calculate relevancy scores for each of the multimedia content elements. The scores may be based on one or more confidence levels, such as a confidence that the text-searchable index accurately represents the audio signals, a confidence that the tags accurately represent the text searchable index, and/or a confidence that the related multimedia content elements match the tags in the query string. A data storage module may be used to store the text-searchable representation of the multimedia content, the tagged content catalog, the topic listing and the query strings.

The web page may, in some instances, be created dynamically in response to the request to display information, whereas in other instances it may be "pre-built" and stored (in cache or on disk, for example) and retrieved upon receipt of the request. The stored web pages may, in some cases, be updated periodically based on a frequency (daily) and/or upon detection of a change in the multimedia content.

In another aspect, the invention provides an article of manufacture having a computer-readable medium with computer-readable instructions embodied thereon for performing the methods and implementing the systems described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention

FIGS. 3-5 are examples of web pages compiled from links to web pages containing multimedia content related to various query search terms.

FIG. 6 is an example of a search result indicating the ranking of a web page compiled using the techniques described herein.

DETAILED DESCRIPTION

Figure 1:
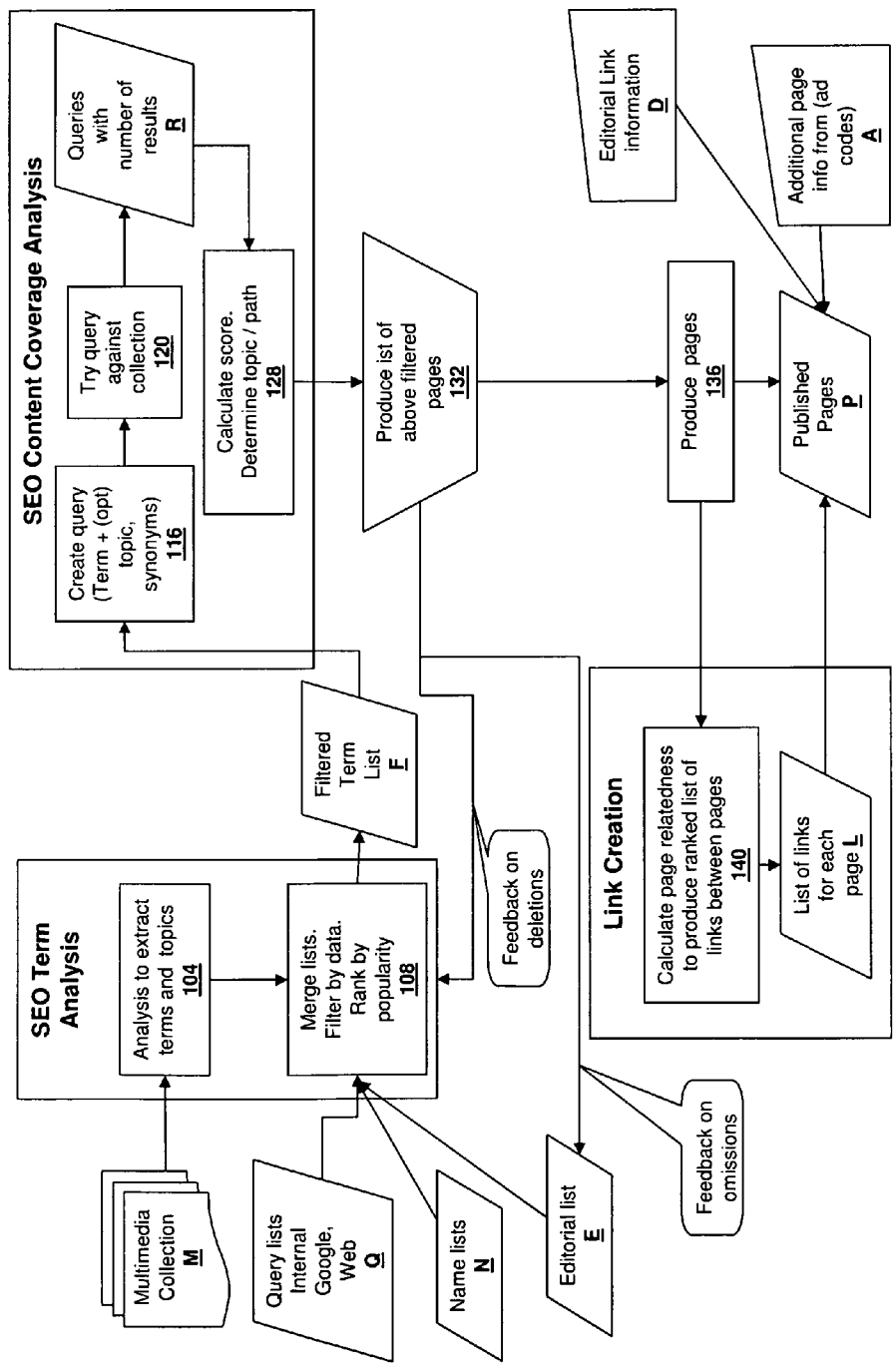
FIG. 1 is a flow chart depicting the process and components for producing web pages that are highly relevant to a search term according to an embodiment of the invention.

FIG. 1 illustrates a process for dynamically producing and publishing web pages that are constructed from a collection of links to multimedia content M from one or more sources such as content publishers, search engine repositories, and others. At a high level, the process includes three phases—a term analysis phase in which key terms are identified, a content coverage phase in which content is searched for the key terms (and variants thereof), and a link creation phase in which relevant links are identified and published as web pages.

Generally, content owners want their content to be easily found and viewed as frequently and by as many people as possible, thereby making the content more valuable, as more views translates into greater advertising revenue. For text-only or text-heavy content (articles, blogs, etc.) increasing viewership is relatively straightforward, as search engine spiders identify occurrences of key words and phrases and build indices on which the search engines operate. However, more and more web-based content includes multi-media content such as video and audio, which search engine spiders do not recognize or process. As a result, a highly-relevant page containing a video of an interview with a well-known celebrity may not appear in a search query result list. This is especially critical when the multimedia content is often the first instance of a particular event posted online, with text-based transcripts and descriptions following hours or days later. Although many websites allow users to "tag" content with metadata (e.g., a series of terms and phrases that describe the content) and therefore be considered by the search engines, the manual and inconsistent nature of this data does not scale for large content collections.

Term Analysis Phase

To address this shortcoming (and still referring to FIG. 1), embodiments of the invention provide a technique and supporting systems for automatically extracting key terms and phrases from multimedia content M and creating virtual topic pages based on current events and popular topics. Initially, one or more speech-to-text processes are executed against the multimedia content M (STEP 104). In some cases, the multimedia content M includes only video with audio, whereas in other embodiments the multimedia content may include audio files and/or text as well as video content. The extracted text items (e.g., words, names, events, phrases, etc.) are associated with the respective content elements as metatags describing the content elements. In some embodiments, terms and/or phrases may be identified that are related to the extracted metatags and further associated with the content elements. For example, if a content element includes the terms "Baseball" "Red Sox" and "Boston", terms such as "Fenway Park" and "Green Monster" may be added as additional metatags for that element, even though those phrases do not actually occur (or occur but were not recognized) in the content element itself.

Suitable methods for extracting terms and phrases from audio content include, but are not necessarily limited to Hidden Markov model (HMM)-based speech recognition, natural language processing systems, as well as others. Examples of other techniques for extracting text from audible speech are described in U.S. Pat. No. 5,241,619, entitled "Word-Dependent N-best Search Method," U.S. Pat. No. 5,621,859, entitled "Single Tree Method for Grammar Directed, Very Large Vocabulary Speech Recognizer," and U.S. Pat. No. 5,960,399, entitled "Client/Server Speech Processor/Recognizer," all of which are incorporated herein by reference.

In addition to compiling the catalog of tagged multimedia content M, a topic list may be compiled from numerous sources of current and/or historical events and culture. This topic list represents a "hot list" of topics, names, places and/or events that are of particular interest to a particular population of people, or Internet users in general. The list may include, for example, the top n search terms submitted to a search engine, current events occurring in the next week, political issues, etc. In one example, lists of search query terms and phrases Q may be merged (STEP 108) with lists of names N (people, geographic locales, landmarks, etc.) and editorial lists E (manually produced and/or edited lists of text items). This merged list may then be combined with (and in some cases duplicates identified and removed from) the terms extracted from the multimedia content M to produce a filtered topic list F. The query search terms and phrases Q may be compiled from multiple sources, including commercial search engines such as Google and Yahoo!, search terms known to be popular based on tools such as WordTracker, as well as internal search query logs from applications and intranet sites managed by a particular entity. The name lists N may be compiled from databases and/or other sites that include, for example, names of all professional sports teams and athletes, top 100 Billboard artists, top-grossing movies and cast members, recent or future television listings, etc. In some embodiments, the editorial lists E are derived from one or more of the name lists N, but edited and/or augmented to meet a particular requirement or market.

Content Coverage Analysis Phase

Once the filtered topic list F is compiled, the relevancy of each content element is determined with respect to each term, or a defined subset thereof. Again referring to FIG. 1, queries strings are built (STEP 116) from the terms in the filtered topic list F. Query strings may include one term from the list F, a combination of terms, synonyms, foreign language translations, and other words known to be related to a term in the list F, creating augmented search or query strings. As an example, if the term "Tom Brady" was identified in the list F, query strings may include not only the term "Tom Brady" but also "Patriots," "New England," "Super Bowl," "Quarterback" as well as others. Common words may also be negated in search strings to avoid documents having a high frequency of use with words known to be irrelevant.

The augmented search strings are executed against the collection M (STEP 120), resulting in a set of query results R. The results R indicate which topics in the topic list F are supported by the collection M (i.e., which topics have a minimum number of content elements that are tagged using the terms in the topic list F). For example, a minimum number of "hits" (e.g., 5 individual content items) may be used to determine if a topic is supported by the content M. In some embodiments, a score may also be used to determine the degree of match or relevancy of a particular content item to a topic. For example, scores are calculated using the results R (STEP 128) to represent the degree of relevance between a topic and each piece of content in the collection M. The scores may be calculated using various techniques, including "term frequency-inverse document frequency" (TF-IDF) weighting. TF-IDF is a statistical quantity used in information retrieval and text mining that measures the importance of a word to a document in a collection of documents. Typically, the importance increases proportionally to the number of times a word appears in the document but is offset by the frequency with which the word appears in the overall collection. Based on the scores, a listing of each content element (or a subset of the collection), its associated path and/or URL and its score is compiled and ordered according to the score (STEP 132). For example, the content collection M may include numerous interviews with NFL coaches and analysts discussing an upcoming football game from various networks and sources. The listing of such interviews may include a title, duration, URL of where the interview may be found on the web, and various phrases and words extracted from the audio portion of the interviews.

Based on the scored list, virtual web pages are defined (STEP 136) based on the content, which, when requested by a user (by, for example, clicking on an HTTP link on a web page) results in the presentation one or more publishable web pages P. These pages include compilations of links back to individual content elements (or pages on which the content elements are published) such that each page presents the most (or highly) relevant links based on a users search query or the topic selected by the user and include text snippets around the query terms showing the terms in their textual context. Although there may be no static HTML code stored on a server that defines the entire content of the web page P, the content of the page P is available to standard search query engines for spidering and indexing, as they contain all the query strings, terms, and text snippets used to determine the scores and ranks of the constituent links. As such, a news aggregation website may use the topic list F as a menu listing for more detailed web pages that include multimedia content about each topic without having to build, maintain or update the actual topic pages. Each topic page is created dynamically in response to a user action (e.g., entering a search query or clicking a link) and includes the content elements deemed most relevant to the topic at the time of the request.

Using the football interview example from above, a web page may be created that includes a brief description of each interview, the text in the interview where Tom Brady or the Super Bowl are mentioned, an image from the interview, and other metadata (e.g., date/time, duration, source, user rating, popularity, etc.) such that when "Tom Brady Super Bowl Interviews" is entered into a commercial search engine, the published page is ranked highly as compared to other pages and appears at or near the top of the results listing. This is because the published page includes multiple, highly relevant multi-media content elements from which key terms have been extracted and processed using the techniques described above.

Additional information such as editorial links D to other sites and web pages as well as page information A such as ad codes and source information may also be added to further enhance the ranking of the page by search engines, the appearance of the page, the commercial potential of the page, or any combination thereof.

Link Creation Phase

In some embodiments, the published pages P may be analyzed to determine links among the pages (STEP 140) to facilitate navigation among the pages P. These links can be computed when the pages are created or dynamically when the page is rendered. Relatedness may be calculated using standard cosign distance functions between key terms or by using search queries built from computing the semantic relatedness of terms based on co-occurrence throughout the collection. The resulting list of links L may then be integrated into the published pages P. In some cases feedback loops provide information back to the term analysis phase to indicate which terms, content elements, and query strings were effective (i.e., resulted in highly ranked pages that were selected by users) or ineffective. In some instances, ineffective terms may be deleted during the merge process (STEP 108).

The published pages P may, in some cases, be stored as static web pages for subsequent presentation. In such cases, however, the links L may change and the content may become outdated. In other instances, the pages P may be created dynamically for one-time presentation and re-generated when the same or similar queries are processed. Such an approach allows for the most current content elements to be included on a query results page that is compiled substantially simultaneously with the user's query, increasing the relevancy of the results.

In some cases, the pages P may also include additional metadata either manually input or contained in the topic lists. The pages may also include links to other topic pages, where those links are input manually, or generated automatically based on a machine similarity score based on an overlap of the topic names, the extracted text and/or keywords of the different pages. In some implementations, a manual editorial review step is performed to filter out unwanted content elements, keywords, links, or, in some cases, entire pages.

Names may be associated with a topic page, again, based on tags and/or keywords. In some cases, the names may change based on changes in the editorial lists used to create the topic listing. For example, a page referencing Senator Obama may be updated with a new name (President Obama) or redirected to a new page having the new name but similar content.

Figure 2:
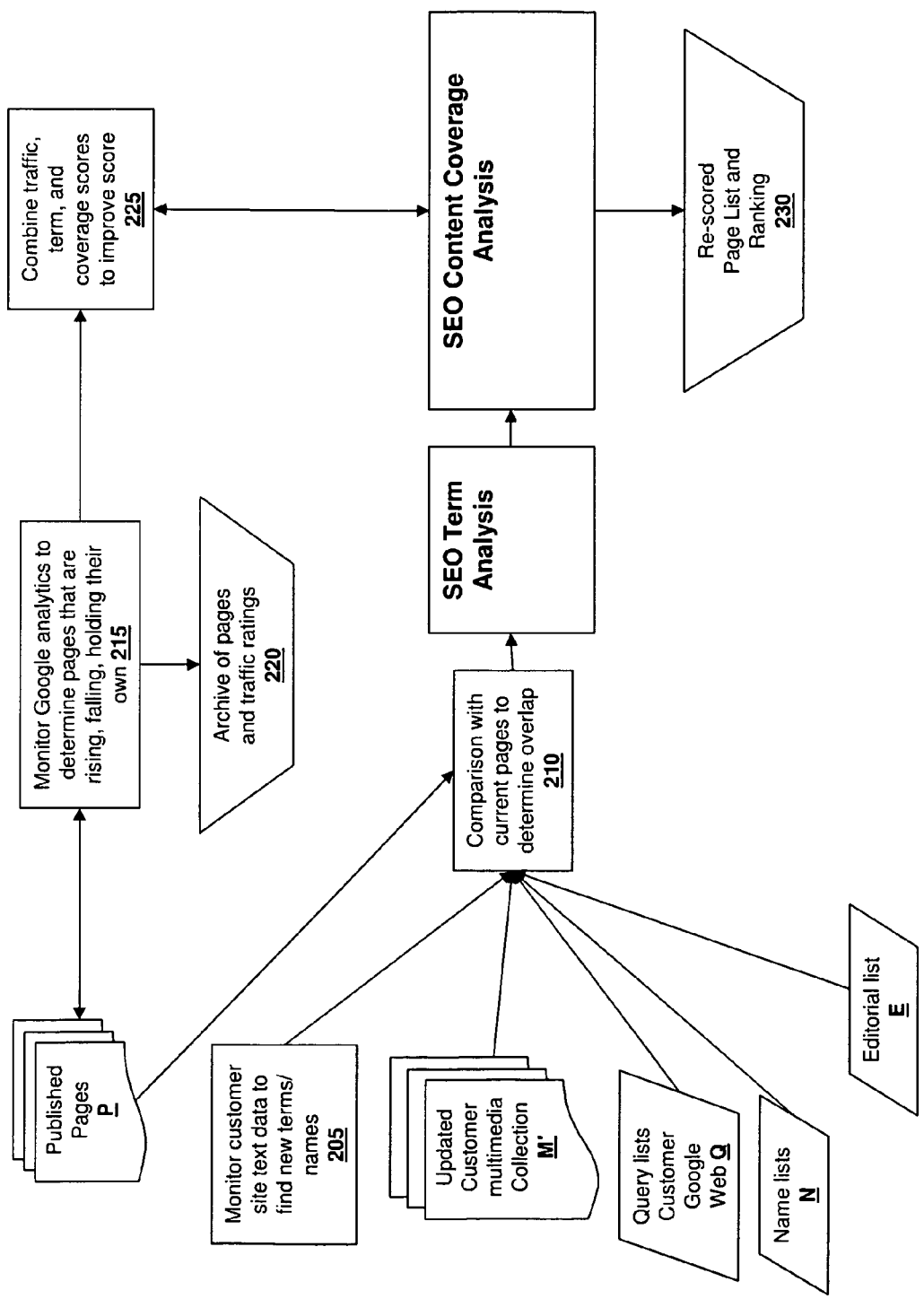
FIG. 2 is a flow chart depicting the process and components for updating web pages that are highly relevant to a search term according to an embodiment of the invention.

Whereas in some implementations the above process may be done once for a collection of multimedia content, in other cases the process may be repeated as new content is added to the collection M. Referring now to FIG. 2, logs from one or more web sites are monitored and analyzed (STEP 205) to determine new names and phrases that have gained (or dropped) in importance over time. For example, as a particular team advances through the NFL playoffs, the team and players' names may be more relevant and searched more frequently than a few weeks ago. Likewise, the content within the multimedia collection evolves over time as videos and audio clips are added and deleted from the collection M, resulting in an updated collection M'. The two collections (M and M') are compared (STEP 210) to determine any overlap (content that is in both) as well as newly added or changed content. Any differences (typically newly added content) are then processed as described above in the term analysis and content coverage phases.

In parallel, the popularity of the published pages P is determined (STEP 215). Services such as Google Analytics provide reports detailing various viewership statistics such as how often a page is viewed, how many other pages link to that page, trends, etc. These statistics may then be combined (STEP 225) with other search engine data (query string frequency, site traffic, popularity, etc.) and incorporated into the content coverage analysis process, resulting in an updated, re-scored, re-ranked listing of content items to be built into landing pages (STEP 230). The viewership statistics may also be archived (STEP 220) for subsequent analytics and reporting.

Figure 3:
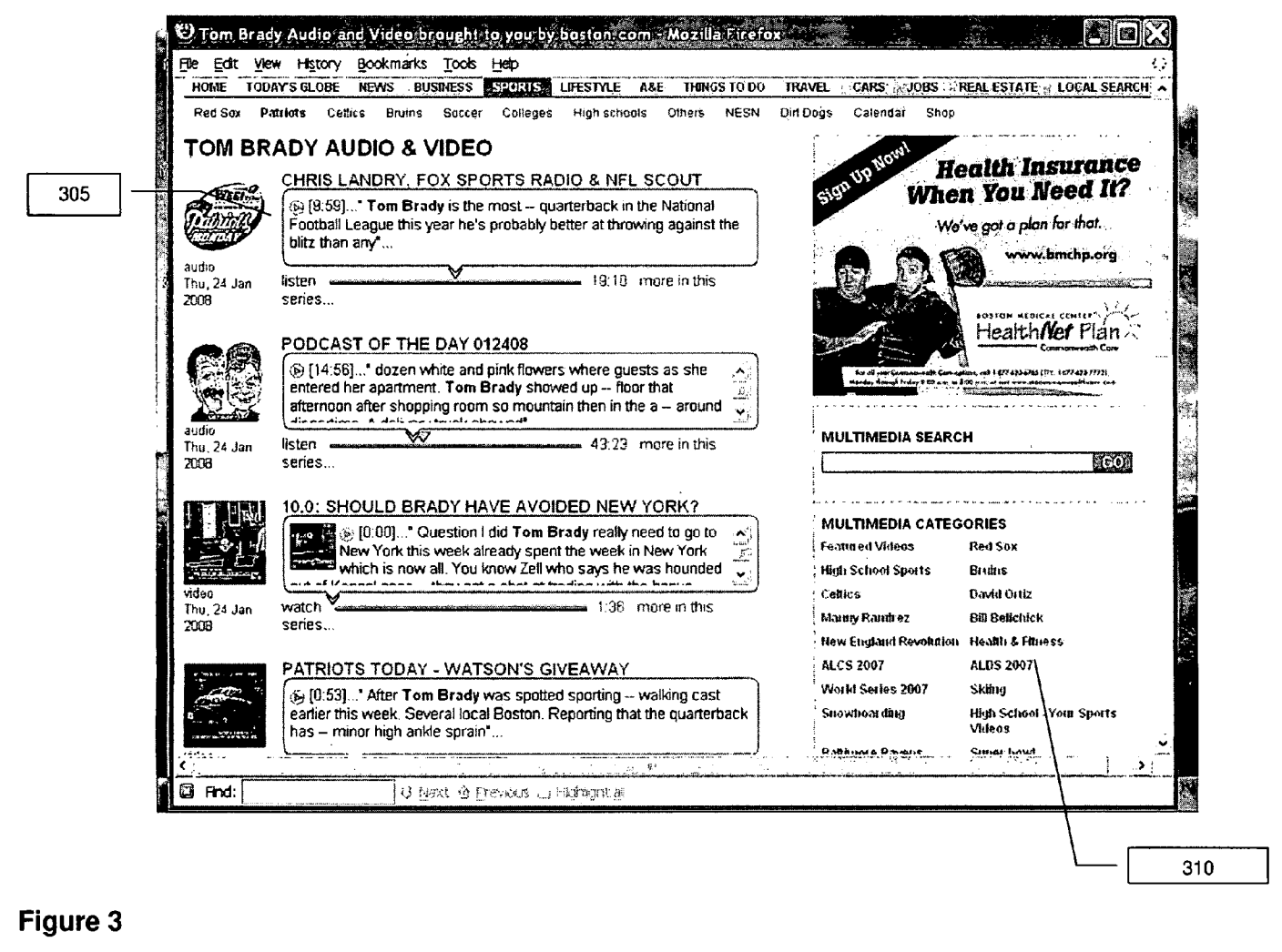
Figure 4:
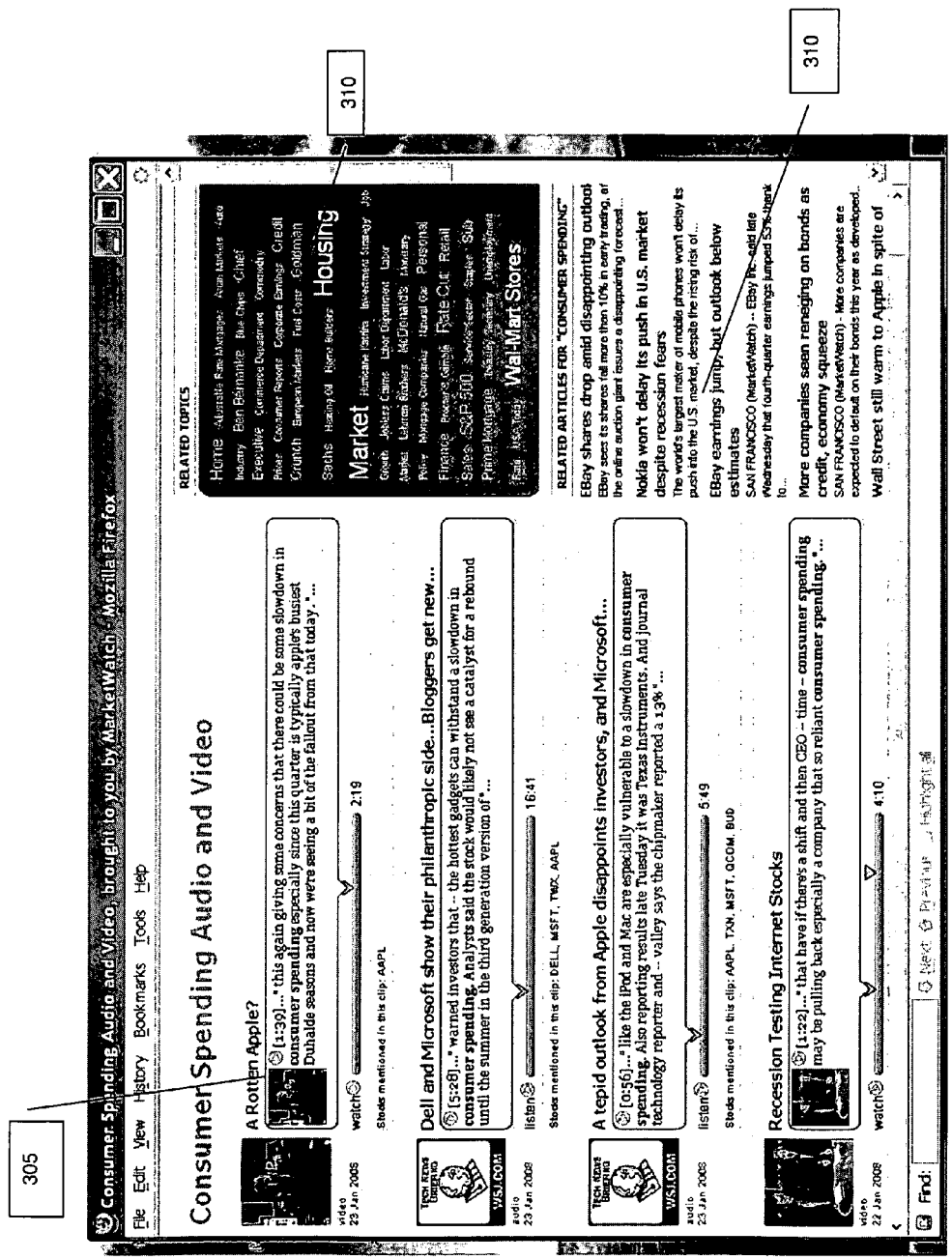
Figure 5:
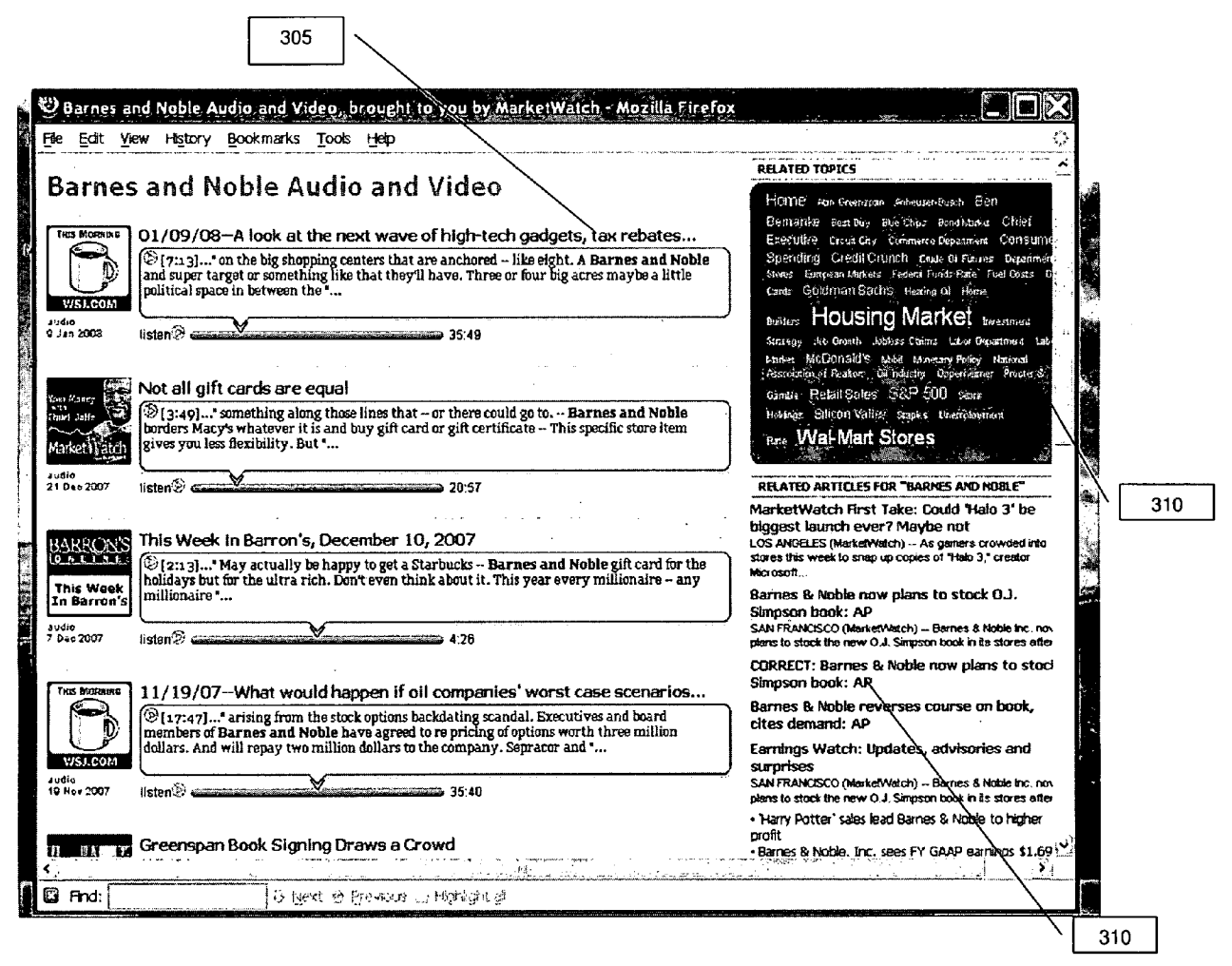

FIGS. 3-5 illustrate the results of using the techniques described above. FIG. 3, for example, is a screen capture of a dynamically constructed landing page 300 that includes multimedia content from various sources (e.g., other websites) presented in response to a search for "Tom Brady." The landing page 300 provides highly relevant, topical and recent multimedia content, including text snippets with the target phrase 305 highlighted. Conventional search techniques using a similar search phrase return numerous text-heavy pages with articles and statistics, each link being from only one source, whereas using the methods described above the user is presented with a listing of multi-media rich content form many different sources on one dynamically created landing page. Further, additional links and/or articles 310 may be provided as other areas of interest based on learned correlations between the searched phrase and other topics. FIGS. 4 and 5 illustrate similar results as FIG. 3 using the phrases "consumer spending" and "Barnes and Noble" as the search phrases, respectively. Links to additional text articles may be provided in addition to the compiled list of multimedia content.

Figure 6:
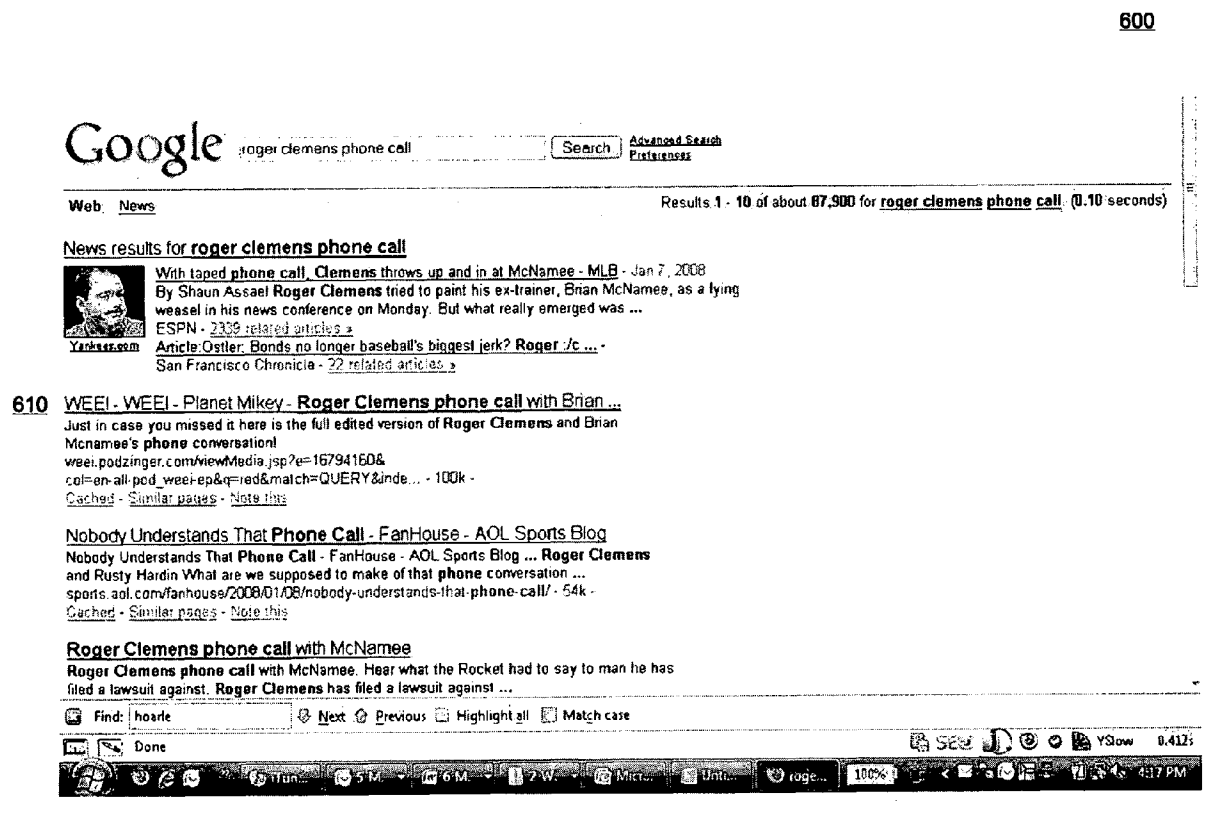

FIG. 6 illustrates how well a landing page 600 produced using the techniques described herein performs in response to a query entered using a standard search engine (Google). The web page listed second (weei.podzinger.com) 610 is constructed from numerous multimedia content elements complied from multiple independent content publishers that were deemed highly relevant to a search string of "Roger Clemens phone call." As a result, a page offered by a local radio station (WEEI of Boston, Mass.) is ranked just below one of the most popular sports-themed websites in the world (ESPN) and above another (sports.aol.com). Note that sites from other networks (CBS, NBC, FOX, ABC) and other sports-related sites (SportsIllustrated, etc.) are not listed. This provides exceptional visibility for otherwise unknown websites, thereby increasing traffic and, as a result, advertising revenues.

Figure 7:
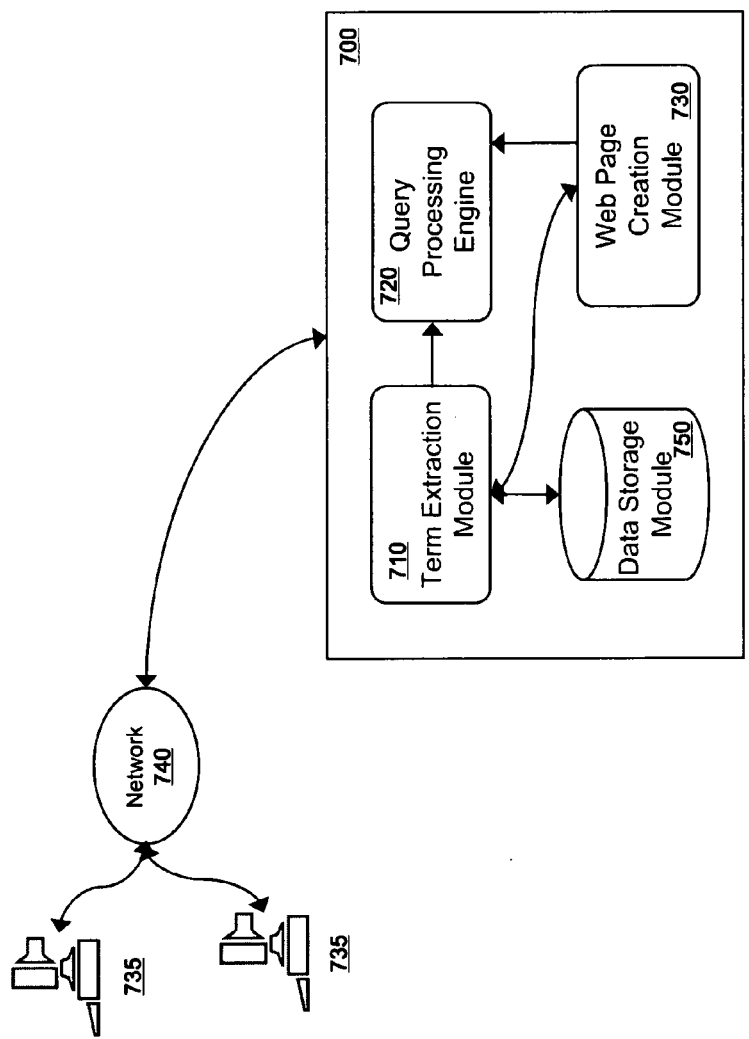
FIG. 7 is a block diagram of a system for implementing the search engine optimization techniques according to an embodiment of the invention.

Referring to FIG. 7, a system 700 for implementing the techniques described above includes a term extraction module 710, a query processing engine 720, and a web page creation module 730 which may be operated on one or more servers.

The term extraction module 710 may include speech-to-text software for converting recorded speech on any type of media content, such as audio and video content including recorded TV shows, programs, podcasts, and broadcasts, recorded movies, recorded music, recorded speeches and lectures, or any other recorded speech found on media content, into text. In another embodiment, the term extraction module 710 can manually convert recorded speech found on various types of media content into text, such as by manually translating speech into text for closed captioning purposes. The term extraction module 710 can receive or discover media content with recorded speech from various media content providers via a communication interface such as a web server (not shown). Once the multimedia content is received, the term extraction module 710 may utilize speech-to-text software to convert the recorded speech into text, and, in some instances store the content, links to the content (e.g., URLs) and/or the extracted text in a database.

The query processing engine 720 may be configured to receive search requests from a client 735, and provides content elements and/or links to the web page creation module 730, which dynamically assembles a web page for presentation to the client 735. The web page can include references pointing to multiple media content elements provided by various unrelated content publishers. In some embodiments, the query processing engine 720 engine receives text from the term extraction module 710 and generates a media content index. The media content index can include other textual descriptive information in addition to the text corresponding to the speech from the media content. For example, the media content index can also store information describing the media content that does not include speech. Such information can include names of characters in media content, sounds that were made in the media content, descriptions of visual locations within the media content, and any other descriptive information related to the media content. The media content index facilitates an efficient search of the media content in response to a request from a client.

The term extraction module 710, query processing engine 720, and web page creation module 730 provide the application processing components that implement the term analysis, content coverage analysis and link creation as described above. These components are preferably implemented on one or more server class computers that have sufficient memory, data storage, and processing power and that run a server class operating system (e.g. SUN Solaris, GNU/Linux, MICROSOFT WINDOWS 2000, and later versions, or other such operating system). Other types of system hardware and software can also be used, depending on the capacity of the device, the number of users and the amount of data received. For example, the server may be part of a server farm or server network, which is a logical group of one or more servers. As another example, there may be multiple servers associated with or connected to each other, or multiple servers may operate independently but with shared data. As is typical in large-scale systems, application software can be implemented in components, with different components running on different server computers, on the same server, or some combination.

Clients 735 interact with the system 700. The clients 735 may include client interface software for reviewing and annotating the multimedia collection, entering and reviewing search queries, displaying and reviewing search and viewership statistics, testing as well as other functions. The client software may be implemented in various forms, for example, in the form of a Java applet that is downloaded to the client and runs in conjunction with a web browser. Alternatively, the client software may be in the form of a standalone application, implemented in a language such as Java, C++, C#, VisualBasic or in native processor-executable code. In one embodiment, if executing on the client, the client software opens a network connection to the server over a communications network and communicates via that connection to the server(s).

The clients 735 are preferably implemented as software running on a personal or professional grade computer workstation (e.g., a PC with an INTEL processor or an APPLE MACINTOSH) capable of running such operating systems as the MICROSOFT WINDOWS family of operating systems from Microsoft Corporation of Redmond, Wash., the MACINTOSH OSX operating system from Apple Computer of Cupertino, Calif., and various varieties of Unix, such as SUN SOLARIS from SUN MICROSYSTEMS, and GNU/Linux from RED HAT, INC. of Durham, N.C. (and others). The clients 735 can also be implemented on such hardware as a smart or dumb terminal, network computer, wireless device, personal data assistant, information appliance, workstation, minicomputer, mainframe computer, or other computing device, that is operated as a general purpose computer or a special purpose hardware device solely used for serving as a client in the system.

A communications network 740 connects the clients 735 with the system 700. The communication may take place via any media such as standard telephone lines, LAN or WAN links (e.g., T1, T3, 56 kb, X.25), broadband connections (ISDN, Frame Relay, ATM), wireless links, and so on. Preferably, the network can carry TCP/IP protocol communications, and HTTP/HTTPS requests made by the client software and the connection between the client software and the system 700 can be communicated over such TCP/IP networks. The type of network is not a limitation, however, and any suitable network may be used. Typical examples of networks that can serve as the communications network include a wireless or wired Ethernet-based intranet, a local or wide-area network (LAN or WAN), and/or the global communications network known as the Internet, which may accommodate many different communications media and protocols.

A data storage module 750 may also be used to store the content collection, lists, and statistics described above. Examples of databases that may be used to implement this functionality include the MySQL Database Server by Sun Microsystems, the PostgreSQL Database Server by the PostgreSQL Global Development Group of Berkeley, Calif., and the ORACLE Database Server offered by ORACLE Corp. of Redwood Shores, Calif.

The modules described throughout the specification can be implemented in whole or in part as a software program (or programs) operating on one or more processors using any suitable programming language or languages (C++, C#, java, Visual Basic, LISP, BASIC, PERL, etc.) and/or as a hardware device (e.g., ASIC, FPGA, processor, memory, storage and the like).

The invention can be embodied in other specific forms without departing from the spirit or essential characteristics thereof. The foregoing embodiments are therefore to be considered in all respects illustrative rather than limiting on the invention described herein.

What is claimed is:

1. A computer-implemented method for producing web pages, the method comprising:
   converting audio signals within a plurality of multimedia content elements into a text-searchable representation of the multimedia content elements, the multimedia content elements comprising video or audio;
   creating, for each topic in subset of topics, a query string comprising tags associated with a set of the multimedia content elements, the query string associated with the topic;
   creating a content catalog from the text-searchable representation of the multimedia content elements, wherein the creating the content catalog includes:
   extracting keywords from the text-searchable representation and associating the keywords with respective multimedia content elements from which the keywords were extracted,
   augmenting the extracted keywords with additional text and phrases related to one or more of the tags and the keywords and associating the additional text and phrases with the respective multimedia content elements, and
   calculating relevancy scores for each multimedia content element of the plurality of the multimedia content elements based on confidence levels comprising a confidence that text-searchable index accurately represents the audio signals, a confidence that the tags accurately represent the text searchable index, and a confidence that the multimedia content elements match the tags in the query string;
   executing a query against the content catalog using a topic listing to identify a subset of topics referenced in the multimedia content elements and, for a topic within the subset of topics, a set of the multimedia content elements related thereto; and
   executing, in response to a request to display information about the topic within the subset of topics; and
   producing dynamically-created web page in response the request to display information about the topic within the subset of topics, wherein the dynamically-created web page comprises links to the multimedia content elements having a minimum relevancy score, wherein the links to the multimedia content elements are ordered based on one or more of relevancy scores of the respective multimedia content elements and a date associated with each multimedia content element of the multimedia content elements.

2. The method of claim 1 wherein the multimedia content elements appear on multiple, unrelated websites.

3. The method of claim 1 further comprising creating a topic web page comprising a listing of the subset of topics wherein each element of the listing references a respective web page.

4. The method of claim 3 wherein the request to display information about the topic comprises a user-initiated selection of one of the subset of topics from the listing.

5. The method of claim 3 wherein the request to display information about the topic comprises a user-initiated search query comprising one of the subset of topics from the listing.

6. The method of claim 1 further comprising compiling the topic listing from query lists, sports rosters, and entertainment listings.

7. The method of claim 1 further comprising compiling the additional text and phrases from topic lists.

8. The method of claim 1 further comprising displaying a web page comprising computer-executable links to the set of related multimedia content elements.

9. The method of claim 8 wherein the web page is created prior to receiving the request to display information about the topic and the web page is recalled from cache upon receipt of the request.

10. The method of claim 9 further comprising updating the web page upon detection of a change in the multimedia content elements.

11. The method of claim 8 wherein the web page further comprises one or more of the tags, the keywords, and the additional text and phrases.

12. The method of claim 8 wherein the web page further comprises a contextual placement of one or more of the tags, the keywords, and the additional text and phrases within each of the related multimedia content elements.

13. A server for producing web pages, the server comprising:
   a processor and memory, the memory comprising:
   a term extraction module for:
   converting audio signals within a plurality of multimedia content elements into a text-searchable representation of the multimedia content elements, the multimedia content elements comprising video or audio;
   creating, for each topic in subset of topics, a query string comprising tags associated with a set of the multimedia content elements, the query string associated with the topic;
   creating a content catalog from the text-searchable representation of the multimedia content elements, wherein the creating the content catalog includes:
   extracting keywords from the text-searchable representation and associating the keywords with respective multimedia content elements from which the keywords were extracted,
   augmenting the extracted keywords with additional text and phrases related to one or more of the tags and the keywords and associating the additional text and phrases with the respective multimedia content elements, and
   calculating relevancy scores for each multimedia content element of the plurality of the multimedia content elements based on confidence levels comprising a confidence that text-searchable index accurately represents the audio signals, a confidence that the tags accurately represent the text searchable index, and a confidence that the multimedia content elements match the tags in the query string;
   a query processing engine for:
   executing a query against the content catalog using a topic listing to identify a subset of topics referenced in the multimedia content elements and, for a topic within the subset of topics, a set of the multimedia content elements related thereto; and executing, in response to a request to display information about the topic within the subset of topics; and producing dynamically-created web page in response the request to display information about the topic within the subset of topics, wherein the dynamically-created web page comprises links to the multimedia content elements having a minimum relevancy score, wherein the links to the multimedia content elements are ordered based on one or more of relevancy scores of the respective multimedia content elements and a date associated with each multimedia content element of the multimedia content elements.

14. The server of claim 13 further comprising a data storage module for storing at least one of the text-searchable representation of the multimedia content elements, the content catalog, the topic listing and the query strings.

15. The server of claim 13 wherein the memory further comprises a web page creation module for producing a web page comprising computer-executable links to the set of related multimedia content elements.

16. The server of claim 15 wherein the web page creation module creates the web page prior to receiving the request to display information about the topic and the web page is recalled from cache upon receipt of the request.

17. The server of claim 15 wherein the web page creation module updates the web page upon detection of a change in the multimedia content elements.

18. A non-transitory computer readable storage medium storing instructions that, when executed by a computer, cause the computer to perform a method for facilitating dynamic production of web pages in response to a search query, the method comprising:

converting audio signals within a plurality of multimedia content elements into a text-searchable representation of the multimedia content elements, the multimedia content elements comprising video or audio;

creating, for each topic in subset of topics, a query string comprising tags associated with a set of the multimedia content elements, the query string associated with the topic;

creating a content catalog from the text-searchable representation of the multimedia content elements, wherein the creating the content catalog includes:

extracting keywords from the text-searchable representation and associating the keywords with respective multimedia content elements from which the keywords were extracted, augmenting the extracted keywords with additional text and phrases related to one or more of the tags and the keywords and associating the additional text and phrases with the respective multimedia content elements, and calculating relevancy scores for each multimedia content element of the plurality of the multimedia content elements based on confidence levels comprising a confidence that text-searchable index accurately represents the audio signals, a confidence that the tags accurately represent the text searchable index, and a confidence that the multimedia content elements match the tags in the query string;

executing a query against the content catalog using a topic listing to identify a subset of topics referenced in the multimedia content elements and, for a topic within the subset of topics, a set of the multimedia content elements related thereto; and executing, in response to a request to display information about the topic within the subset of topics; and producing dynamically-created web page in response the request to display information about the topic within the subset of topics, wherein the dynamically-created web page comprises links to the multimedia content elements having a minimum relevancy score, wherein the links to the multimedia content elements are ordered based on one or more of relevancy scores of the respective multimedia content elements and a date associated with each multimedia content element of the multimedia content elements.

19. The non-transitory computer readable storage medium of claim 18 wherein the method further comprises compiling the multimedia content elements from multiple, unrelated websites.

20. The non-transitory computer readable storage medium of claim 18 wherein the method further comprises creating a topic web page comprising a listing of the subset of topics wherein each element of listing references a respective dynamically-created web page.

21. The non-transitory computer readable storage medium of claim 18 wherein the method further comprises augmenting the extracted keywords with additional text and phrases related to the extracted keywords and associate the additional text and phrases with the respective multimedia content elements.

22. The non-transitory computer readable storage medium of claim 18 wherein the method further comprises contextually displaying the keywords with the related multimedia content elements.

23. The non-transitory computer readable storage medium of claim 18 wherein the method further comprises calculating relevancy scores for each of the plurality of multimedia content elements based on a degree of match between the extracted keywords and each topic in the topic listing.

24. The non-transitory computer readable storage medium of claim 23 wherein the links to the multimedia content elements are ordered based on the relevancy scores of respective content elements.

25. The non-transitory computer readable storage medium of claim 18 wherein the method further comprises compiling the topic listing from query lists, sports rosters, and entertainment listings.

26. The non-transitory computer readable storage medium of claim 18 wherein the method further comprises compiling the additional text and phrases from topic lists.

27. The non-transitory computer readable storage medium of claim 18 wherein the method further comprises displaying a dynamically-created web page comprising computer-executable links to the set of related multimedia content elements.

* * * * *